United States Patent
Ohmori et al.

(10) Patent No.: US 6,634,072 B2
(45) Date of Patent: Oct. 21, 2003

(54) MACHINING APPARATUS AND EQUIPMENT OF THIN SECTION LONG WORKPIECE

(75) Inventors: Hitoshi Ohmori, Wako (JP); Kenichi Yoshikawa, Chiyoda-ku (JP); Takahiro Miura, Minami-ku (JP); Naoshi Iwamitsu, Minami-ku (JP)

(73) Assignees: Riken, Saitama (JP); The Nexsys Corporation, Tokyo (JP); Ikegami Precision Tooling Co., Ltd., Nagoya (JP)

( * ) Notice: Subject to any disclaimer, the term of this patent is extended or adjusted under 35 U.S.C. 154(b) by 0 days.

(21) Appl. No.: 10/025,859

(22) Filed: Dec. 26, 2001

(65) Prior Publication Data

US 2002/0078541 A1 Jun. 27, 2002

(30) Foreign Application Priority Data

Dec. 26, 2000 (JP) .................................. 2000-394282
Aug. 21, 2001 (JP) .................................. 2001-249976

(51) Int. Cl.⁷ ........................ B23B 39/00; B23B 7/00; B21B 15/00
(52) U.S. Cl. .................. 29/26 A; 29/33 R; 29/26 R; 29/33 P; 29/57; 29/27 C; 29/27 R; 269/20; 269/25; 269/58; 82/128
(58) Field of Search ............... 29/26 A, 26 R, 29/33 T, 33 D, 33 R, 57, 27 C, 27 R; 269/20, 25, 58, 69, 55; 82/128

(56) References Cited

U.S. PATENT DOCUMENTS

| | | | | |
|---|---|---|---|---|
| 718,035 A | * | 1/1903 | Tindel | 72/299 |
| 2,320,079 A | * | 5/1943 | Hartwig | 269/69 |
| 3,069,153 A | * | 12/1962 | Brown | 269/58 |
| 3,868,101 A | * | 2/1975 | Nozaki et al. | 269/25 |
| 4,149,708 A | * | 4/1979 | Fink et al. | 269/69 |
| 4,483,052 A | * | 11/1984 | Stuart | 29/57 |
| 4,491,307 A | * | 1/1985 | Ellefson | 269/55 |
| 5,325,581 A | * | 7/1994 | Sun et al. | 29/563 |
| 5,343,603 A | * | 9/1994 | Pioch | 29/27 C |
| 5,690,323 A | * | 11/1997 | Puttmer et al. | 269/20 |
| 6,227,086 B1 | * | 5/2001 | Lumberg | 83/54 |

FOREIGN PATENT DOCUMENTS

| | | | | |
|---|---|---|---|---|
| CH | 610797 | * | 5/1979 | 82/128 |
| DE | 3625638 | * | 2/1988 | 29/33 T |
| EP | 634247 | * | 1/1995 | 29/33 T |
| GB | 2078563 | * | 1/1982 | 29/26 A |

* cited by examiner

Primary Examiner—A. L. Wellington
Assistant Examiner—Dana Ross
(74) Attorney, Agent, or Firm—Griffin & Szipl, P.C.

(57) ABSTRACT

There is a workpiece clamp device 10 for horizontally holding a thin section long workpiece 1 having a constant section shape or having the same section shape in spaced positions in a longitudinal direction in two positions of the same section shape. The workpiece clamp device 10 is constituted of a driving clamp device 10A and a driven clamp device 10B comprising the same holding device 12. The driving clamp device 10A rotates the workpiece 1 centering on a horizontal axis O extending in a longitudinal direction of the workpiece, and the driven clamp device 10B follows movement of the workpiece and idles centering on the horizontal axis. An arbitrary portion to be machined of the workpiece can be directed in a direction in which the portion is easily machined by the rotation (e.g., upward direction).

14 Claims, 8 Drawing Sheets

MACHINING APPARATUS AND EQUIPMENT OF THIN SECTION LONG WORKPIECE

BACKGROUND OF THE INVENTION

1. Technical Field of the Invention

The present invention relates to a machining apparatus and equipment of a thin section long workpiece which machines the workpiece without using an exclusive-use jig. The thin section long workpiece has a constant thin section shape or has the same thin section shape at spaced positions in a longitudinal direction.

2. Description of the Related Art

Various thin workpieces of continuous lengths, which have constant section shapes as shown in FIG. 1, have been used as general building materials such as an aluminum sash. In this application such thin workpieces of continuous lengths are refered as "thin section long workpieces".

These thin section long workpieces are usually formed of metal materials such as an aluminum alloy, continuously manufactured by molding means such as extrusion molding, cut in predetermined lengths, and marketed. Moreover, when the thin section long workpiece is used as the aluminum sash, the workpiece is held by an exclusive-use jig adapted to the section shape, and an attachment hole of a key or the like or a threaded hole is machined. Also in the hole machining or the threaded hole machining, a tool for exclusive use adapted to the section shape of the thin section long workpiece is used.

Figure 1A:
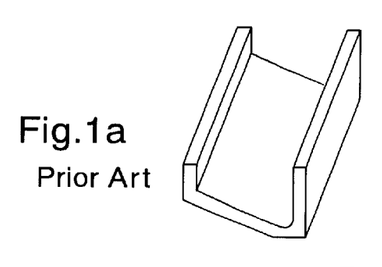
FIG. 1 is a schematic diagram of various thin section long workpieces which section shapes are constant.
Figure 1B:
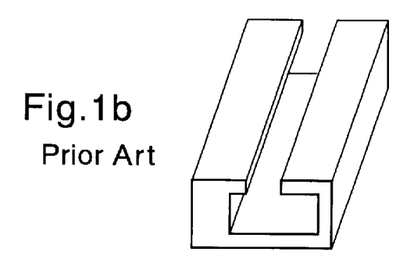
Figure 1C:
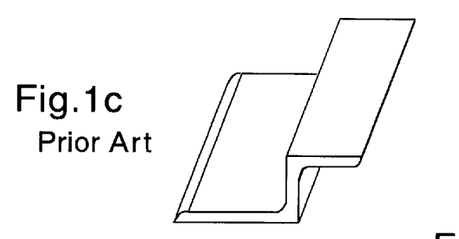
Figure 1D:
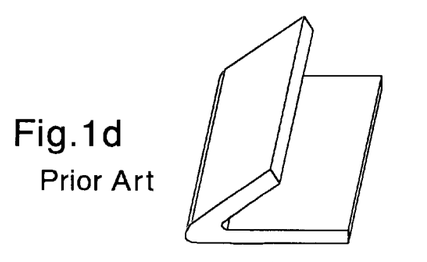
Figure 1E:
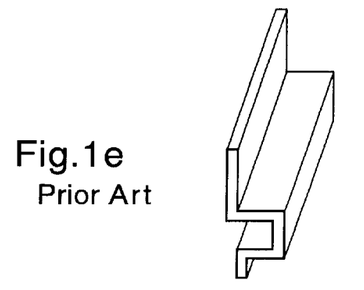
Figure 1F:
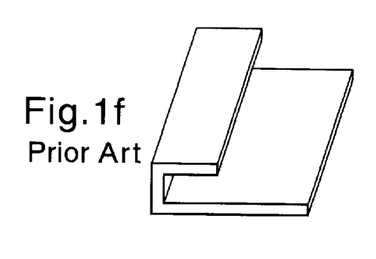
Figure 1G:
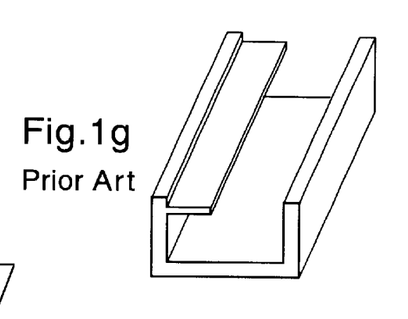
Figure 1H:
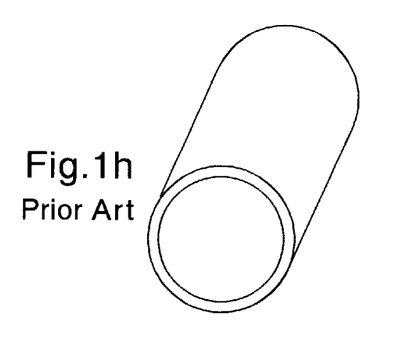
Figure 1I:
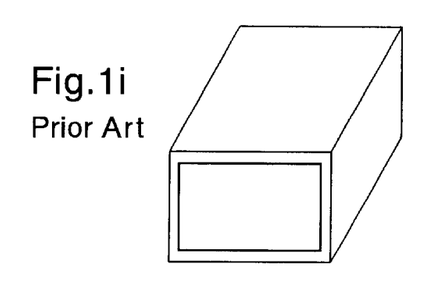
Figure 2J:
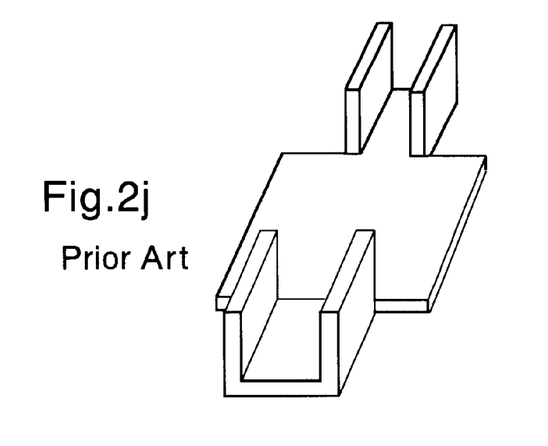
FIG. 2 is a schematic diagram of the thin section long workpiece having the same section shape in spaced positions in a longitudinal direction.
Figure 2K:
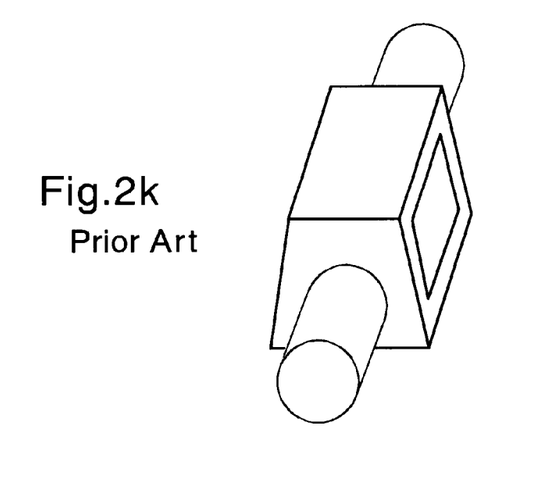
Figure 2L:
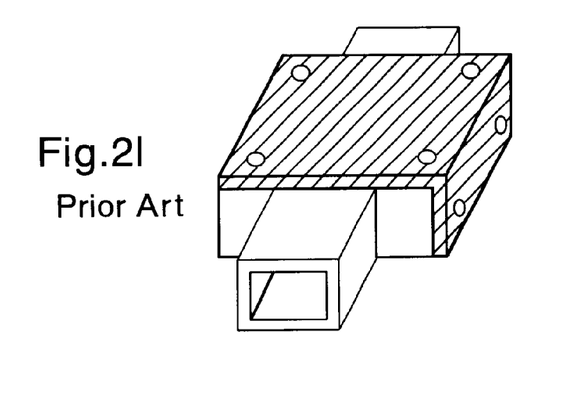

FIG. 2 shows some examples in which a portion to be fixed in machining is different from a portion to be machined. That is, FIGS. 2*j* and 2*k* show that rectangular or cylindrical members or pipes are connected (fastened) to opposite ends, and FIG. 2*l* shows a member as a machining object with diagonal lines, which has the same section shape in spaced positions in a longitudinal direction.

As described above, in a conventional art, when a hole or a threaded hole is machined in the thin section long workpiece having a constant section shape and when the workpiece shown in FIG. 2 is machined, an exclusive-use jig or tool adapted to the section shape of the workpiece is necessary. Therefore, especially when variety of products are produced in small quantities, costs of the jig or the tool piles up, resulting in cost increase. Moreover, the jig or the tool requires long manufacturing times, and there is a problem that a total number of manufacturing period is increased. Furthermore, particularly when a small quantity of products are manufactured, a skilled worker manually machines these workpiece, therefore a dispersion of quality increases, and efficiency is disadvantageously deteriorated.

SUMMARY OF THE INVENTION

The present invention has been developed in order to solve the problem. That is, an object of the present invention is to provide machining apparatus and equipment of a thin section long workpiece, in which a side portion of the thin section long workpiece having a constant section shape or having the same section shape in spaced positions in a longitudinal direction is efficiently machined in an arbitrary shape in a short time without any exclusive-use jig or tool.

According to the present invention, there is provided a machining apparatus of a thin section long workpiece, comprising a workpiece clamp device (10) for horizontally holding the thin section long workpiece (1) having a constant section shape or having the same section shape in spaced positions in a longitudinal direction in two positions of the same section shape, wherein the workpiece clamp device (10) is constituted of a driving clamp device (10A) and a driven clamp device (10B) having the same holding device (12), the driving clamp device (10A) rotates the thin section long workpiece centering on a horizontal axis O extending in the longitudinal direction of the thin section long workpiece, and the driven clamp device (10B) follows the thin section long workpiece and idles centering on the horizontal axis.

According to the constitution of the present invention, the same holding device (12) disposed in both the driving clamp device (10A) and the driven clamp device (10B) can horizontally hold the thin section long workpiece (1) having the same section shape in two positions of the same section shape. Moreover, since the driving clamp device (10A) rotates the thin section long workpiece (1) centering on the horizontal axis O extending in the longitudinal direction of the thin section long workpiece (1), an arbitrary portion to be machined of the rotated thin section long workpiece can be directed in a direction for easy machining (e.g., upward direction). Furthermore, the driven clamp device (10B) follows the thin section long workpiece (1) and idles centering on the horizontal axis O so that the whole workpiece can be held constantly horizontally.

Therefore, while the thin section long workpiece is held constantly horizontally, the portion to be machined of the workpiece is directed in the direction for easy machining (e.g., upward direction), and the side portion of the workpiece can be machined efficiently by an appropriate machining tool (e.g., a drill and an end mill).

According to a preferable embodiment of the present invention, the holding device (12) includes: a hollow ring (13) supported so as to be rotatable centering on the horizontal axis O and which inner portion has a cylindrical shape; an intersecting flat member (14) attached to an inner portion of the hollow ring and which has two flat portions extending in parallel with the horizontal axis and crossing at some angles to each other; and a holding head (15) directly moved in a diametrical direction toward the intersecting flat member and freely tilted centering on an axis parallel to the horizontal axis O.

According to the constitution, the thin section long workpiece (1) is horizontally held through the hollow rings (13) of both the driving clamp device (10A) and the driven clamp device (10B), and the respective holding heads (15) are directly moved toward the intersecting flat member (14), so that the thin section long workpiece (1) can be held between the holding head (15) and the intersecting flat member (14).

Moreover, in this case the intersecting flat member (14) has two flat portions extending in parallel to the horizontal axis O and crossing at some angles to each other, and the holding head (15) tilts centering on the axis parallel to the horizontal axis O. Therefore, even when the thin section long workpiece (1) has a complicated odd-shaped section, at least three points including contact points of two flat portions and a contact point of the holding head (15) contact the thin section long workpiece. Therefore the thin section long workpiece (1) can securely be fixed in order to bear machining resistance during machining.

Furthermore, the machining apparatus includes: a machining head (21) having a machining tool (2) and a machining liquid supply device and driven centering on a vertical axis Z; and a NC driving device (22) for driving the machining head in a Z-axis direction, and X-axis direction and Y-axis direction crossing at right angles to the Z-axis direction with respect to the thin section long workpiece (1) by numerical control.

According to the constitution, the thin section long workpiece (1) remains to be horizontally held, the portion to be machined is directed in a direction in which the workpiece is easily machined (e.g., upward direction), and a machining liquid is supplied by the machining liquid supply device. The machining tool (2) attached to the machining head (21) is numerically controlled in three axis directions, and the portion to be machined can accurately be machined.

Furthermore, the NC driving device (22) includes: a Z-axis driving device (24) for driving the machining head (21) in the Z-axis direction by numerical control; an X-axis driving device (26) for driving the Z-axis driving device in the horizontal X-axis direction crossing at right angles to the horizontal axis O by numerical control; and a Y-axis driving device (28) for driving the X-axis driving device in the Y-axis direction parallel to the horizontal axis O by the numerical control.

According to the constitution, the Z-axis driving device (24) drives the machining head (21) in the Z-axis direction by the numerical control, the X-axis driving device (26) drives the Z-axis driving device and machining head in the horizontal X direction crossing at right angles to the horizontal axis O by the numerical control, and the Y-axis driving device (28) can drive the X-axis driving device, Z-axis driving device, and machining head in the Y-axis direction parallel to the horizontal axis O by the numerical control. Therefore, these driving devices (24, 26, 28) numerically control the machining tool (2) attached to the machining head (21) in three axis directions, and the portion to be machined can accurately be machined.

Moreover, the machining head (21) is an ultrasonic device which generates a straight vibration of the Z-axis direction, or a torsional vibration around the Z-axis direction.

According to the workpiece, burrs can be reduced, and the apparatus can be applied to hard materials.

The machining tool is a cutting tool having an intermittently cutting blade, a grinding tool having a continuously cutting blade, or a polishing tool having much elasticity. These tools can process a broad range of materials other than metals, such as glass, ceramic, carbide alloy, and semiconductor (ceramic).

The cutting tool has an end mill shape for machining the side portion in an upper portion of the Z-axis direction, and also has a drill shape for making a hole or machining an end portion in a lower portion of the Z-axis direction. According to this composite cutting tool, hole making and hole-expanding (shape) machining as a transverse feeding of the workpiece can effectively be realized by one tool.

The grinding tool is preferably formed of a conductive grindstone, and includes an electrolytic dressing device. The constitution enables a high-quality hole machining (hole making, and shape machining) of the hard material.

The driving clamp device (10A) includes a worm driving device having a worm and worm wheel, or a belt driving device having a belt, pulley, and brake. According to the constitution, the thin section long workpiece (1) can smoothly be driven centering on the horizontal axis O, and positioned.

Moreover, according to the present invention, there is provided a machining equipment of a thin section long workpiece, comprising: a conveying apparatus (34) for horizontally conveying the thin section long workpiece (1) in a width direction of the workpiece; a plurality of workpiece machining apparatuses arranged at spaces in the width direction of the workpiece; and an carrying apparatus (36) for carrying in the thin section long workpiece into each machining apparatus and carrying out the workpiece from the machining apparatus, wherein the thin section long workpiece is continuously subjected to different machinings.

According to the constitution, the conveying apparatus (34) horizontally conveys the thin section long workpiece (1) in the width direction of the workpiece, and the carrying apparatus (36) carry in the thin section long workpiece into each machining apparatus and carry out the workpiece from the apparatus. Therefore, the plurality of workpiece machining apparatuses (20) arranged at the space in the width direction of the workpiece can continuously perform different machinings on the thin section long workpiece at the same time. The odd-shaped workpieces such as an aluminum sash can continuously be machined, a machining time per workpiece is shortened, and productivity can be enhanced.

Moreover, according to the present invention, there is provided a machining equipment of a thin section long workpiece, comprising: a conveying apparatus (34) for horizontally conveying the thin section long workpiece (1) in a width direction of the workpiece; a plurality of workpiece machining apparatuses arranged at an space in the width direction of the workpiece; and a reciprocating apparatus (38) for reciprocating the machining apparatus in a longitudinal direction of the workpiece, wherein the thin section long workpiece is continuously subjected to different machinings.

According to the constitution, the conveying apparatus (34) horizontally conveys the thin section long workpiece (1) in the width direction of the workpiece, and the reciprocating apparatus (38) reciprocates the machining apparatus in the longitudinal direction of the thin section long workpiece, so that the end of the thin section long workpiece is carried in each machining apparatus and carried out from them. Therefore, the plurality of workpiece machining apparatuses (20) arranged at spaces in the width direction of the workpiece can continuously perform the different machining on the thin section long workpiece at the same time.

Other objects and advantageous characteristics of the present invention will be apparent from the following description with reference to the accompanying drawings.

DETAILED DESCRIPTION OF THE PREFERRED EMBODIMENTS

Preferred embodiments of the present invention will be described hereinafter with reference to the accompanying drawings. Additionally, common portions are denoted with the same reference numerals in the respective drawings, and redundant description is omitted.

Figure 3:
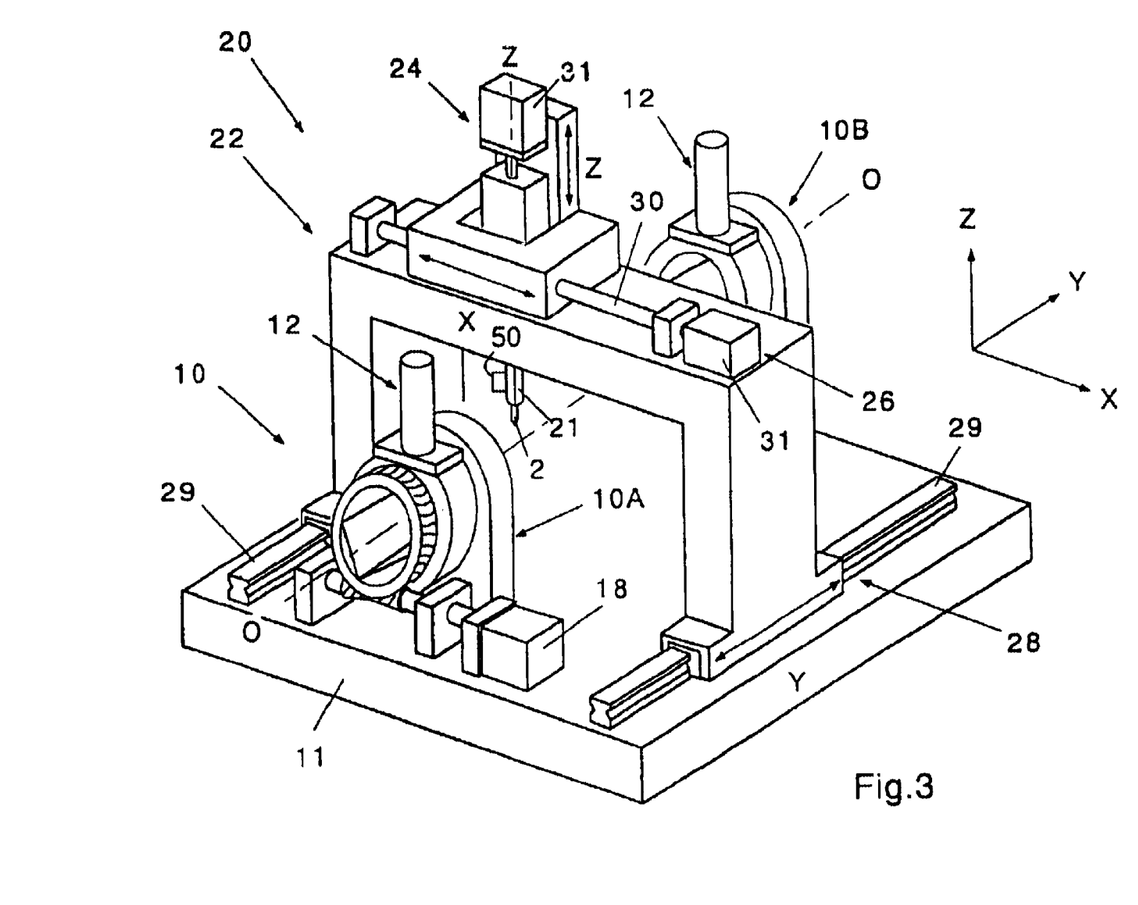
FIG. 3 is a whole perspective view of a first embodiment of a machining apparatus of the thin section long workpiece according to the present invention.

FIG. 3 is a whole perspective view of a machining apparatus of a thin section long workpiece according to the present invention. As shown in FIG. 3, a workpiece machining apparatus 20 of the present invention includes a workpiece clamp device 10 for horizontally holding a thin section long workpiece 1 in two spaced positions in the longitudinal direction of the workpiece. The workpiece 1 has a constant section shape or the same section shape in spaced positions in a longitudinal direction as shown in FIGS. 1 and 2. The workpiece clamp device 10 is constituted of a driving clamp device 10A on a front side and a driven clamp device 10B on a rear side. These devices 10A and 10B are fixed to a common bed 11.

Figure 4:
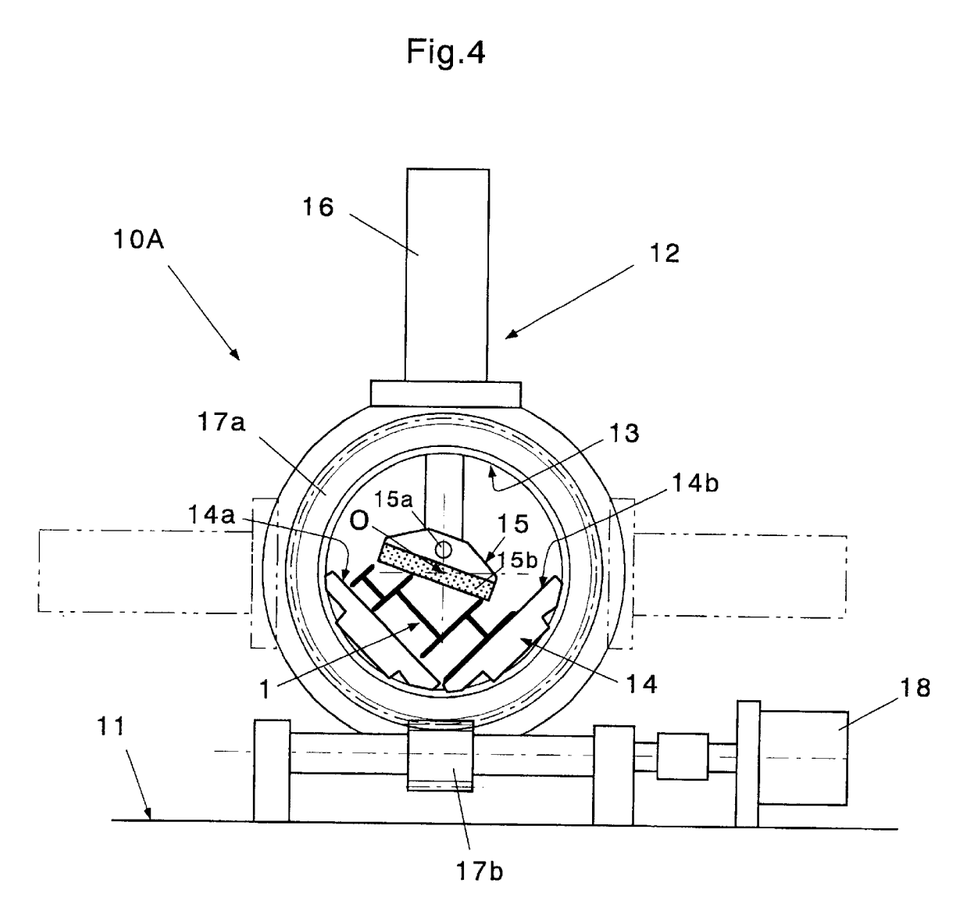
FIG. 4 is a front view of a workpiece clamp device constituting the machining apparatus of the present invention.

FIG. 4 is a front view of the driving clamp device 10A of FIG. 3. The driving clamp device 10A and driven clamp device 10B include holding devices 12, respectively. The holding device 12 includes a hollow ring 13 which inner portion is cylindrical, an intersecting flat member 14, and a holding head 15.

A horizontal axis O is a center axis of the hollow ring 13, and the hollow ring 13 is supported by some bearings (not shown) so as to be rotatable centering on the horizontal axis O.

The intersecting flat member 14 is detachably attached to the inner portion of the hollow ring 13 by a bolt (not shown). Moreover, the intersecting flat member 14 has two flat portions 14a, 14b inside. These two flat portions 14a, 14b extend in parallel to the horizontal axis O, cross at some angles to each other, and form a V-shaped member support portion therebetween. The two flat portions 14a, 14b preferably form an angle of 90 degrees.

The holding head 15 is disposed in the hollow ring positioned opposite to the intersecting flat member 14, and directly moved in a diametrical direction toward the intersecting flat member by a straight-moving cylinder 16 (e.g., air cylinder). Moreover, the holding head 15 can freely tilts centering on a pin 15a parallel to the horizontal axis O. Furthermore, an elastic member 15b (e.g., urethane rubber) is attached to the holding head 15 on an intersecting flat member side so that the thin section long workpiece 1 is prevented from being damaged.

Additionally, a structure and dimensions of the holding device 12 are the same with the driving clamp device 10A and driven clamp device 10B. According to the constitution, even when the thin section long workpiece 1 has a complicated odd-shaped section, at least three points including contact points of two flat portions 14a, 14b and a contact point (elastic member 15b) of the holding head 15 contact the thin section long workpiece 1, the thin section long workpiece 1 can securely be fixed in order to bear machining resistance during machining.

The driving clamp device 10A shown in FIG. 4 further includes a worm driving device having a worm wheel 17a fixed to the hollow ring 13 and a worm 17b which meshes with the worm wheel 17a. The worm 17b is driven by a driving device 18. Therefore, the driving device 18 rotates the worm gears 17a, 17b, and can freely rotate the thin section long workpiece 1 held by the holding device 12 centering on the horizontal axis O.

According to the constitution, an arbitrary portion to be machined of the thin section long workpiece 1 can be directed in a direction in which the portion is easily machined (e.g., upward direction) by rotation of the driving clamp device 10A. Additionally, the straight-moving cylinder 16 is also rotated centering on the horizontal axis O. Therefore, the thin section long workpiece 1 is rotated in a range in which the straight-moving cylinder 16 does not interfere with the bed 11.

On the other hand, the driven clamp device 10B does not include the worm gears 17a, 17b. The driven clamp device 10B is supported to simply follow movement of the thin section long workpiece 1 and to idle centering on the horizontal axis O, and follows the rotation of the thin section long workpiece 1 by the driving clamp device 10A and rotates.

In FIG. 3, the machining apparatus 20 of the thin section long workpiece of the present invention further includes a machining head 21 and a NC driving device 22. The machining head 21 has a machining tool 2 and machining liquid supply device (50), and drives the machining tool 2 (e.g., drill, end mill, grindstone, and the like) centering on a vertical axis Z.

The machining head 21 is an ultrasonic device which generates a straight vibration of the Z-axis direction, or a torsional vibration around a Z axis. Moreover, the machining tool 2 is a cutting tool having an intermittently cutting blade, a grinding tool having a continuously cutting blade, or a polishing tool having much elasticity.

The cutting tool has an end mill shape for machining a side portion in an upper portion of the Z-axis direction, and also has a drill shape for making a hole or machining an end portion in a lower portion of the Z-axis direction. Moreover, the grinding tool is preferably formed of a conductive grindstone, and includes an electrolytic dressing device.

The NC driving device 22 drives the machining head 21 in the Z-axis direction, and X-axis direction and Y-axis direction crossing at right angles to the Z-axis direction with respect to the thin section long workpiece 1 by numerical control.

In the example of FIG. 3, the NC driving device 22 includes: a Z-axis driving device 24 for driving the machining head 21 in the Z-axis direction by the numerical control; an X-axis driving device 26 for driving the Z-axis driving device 24 in the horizontal X-axis direction crossing at right angles to the horizontal axis O by the numerical control; and a Y-axis driving device 28 for driving the X-axis driving device 26 in the Y-axis direction parallel to the horizontal axis O by the numerical control.

Each of the driving devices 24, 26, 28 is constituted of a guide rail 29, ball screw 30, ball nut, motor 31, and the like, and is NC-controlled along three axes by a NC control device (not shown).

As described above, in the machining apparatus 20 of the thin section long workpiece according to the present invention, front and back fixing jigs are mounted with three-axes NC control device, and the thin section long workpiece 1 is machined by a four-axes control including a rotation index control of the fixing jig and three-axes NC control.

In the structure, only the machining head 21 moves during machining, and the workpiece 1 (thin section long workpiece) and workpiece fixing jig (workpiece clamp device 10) do not move. The thin section long workpiece 1 is an object. Therefore, if the workpiece 1 moves in the Y-axis direction or the Z-axis direction, machining precision is possibly deteriorated. Moreover, by cutting or grinding using a small-diameter tool, a cutting of a protrusion (fin) is possible in addition to a hole making, circle cutting, square extraction, and odd-shape extraction machinings.

FIG. 5 is a diagram schematically showing a machining position of the thin section long workpiece 1 by the machining apparatus 20 of the present invention. The machining of the thin section long workpiece 1 by the machining apparatus 20 can be performed in the following order.

(1) Insert the workpiece, (2) fix the workpiece, (3) control the rotation of the workpiece, (4) machining the workpiece, (5) end the machining, (6) return the workpiece fixing jig to an original point, (7) release the fixed workpiece, and (8) carry out the workpiece. Among these steps, steps (2) to (7) are performed by NC control.

Figure 5A:
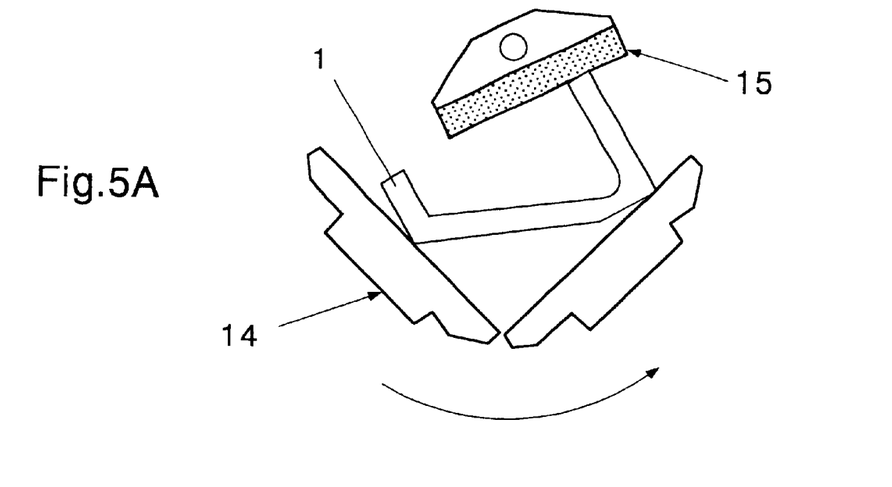
FIG. 5 is a schematic diagram showing a machining position of the thin section long workpiece according to the machining apparatus of the present invention.
Figure 5B:
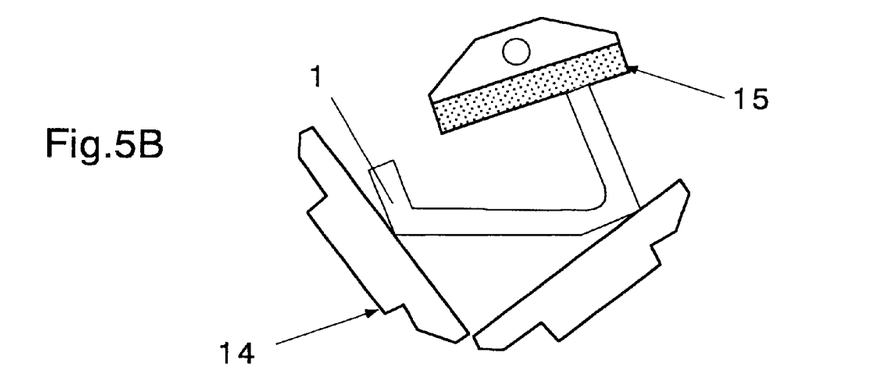
Figure 5C:
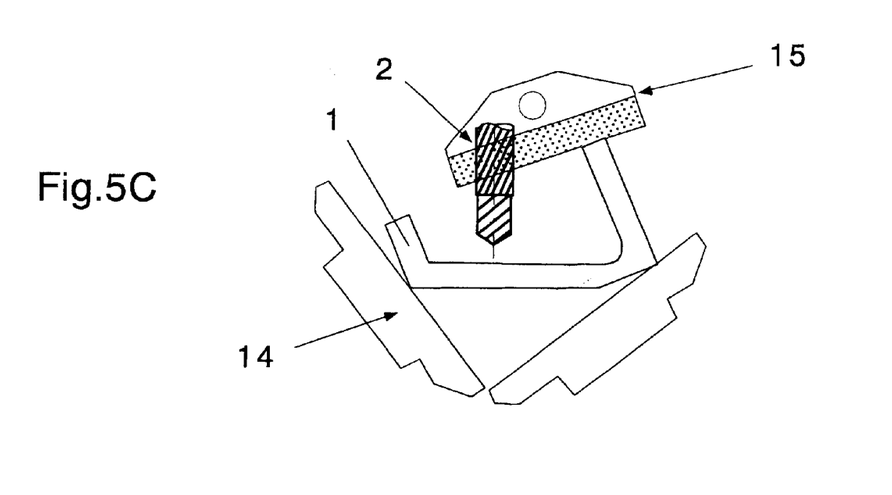

FIG. 5A shows that the workpiece 1 is inserted and is then fixed, FIG. 5B shows the rotation control of the workpiece 1, and FIG. 5C shows the machining. As shown in FIGS. 5B and 5C, the thin section long workpiece 1 is constantly horizontally held. And the portion to be machined of the workpiece 1 is directed in a direction in which the portion is easily machined (e.g., upward direction). Then the side portion of the workpiece 1 is machined with an appropriate machining tool 2. Additionally, in the example, the machining tool 2 is used which tip end is constituted as a drill and which middle portion is constituted as an end mill. When the tool 2 is used, an end mill machining can be performed continuously after a hole-making machining. A through hole having an arbitrary shape can efficiently be machined in the side portion of the thin section long workpiece 1.

Figure 6:
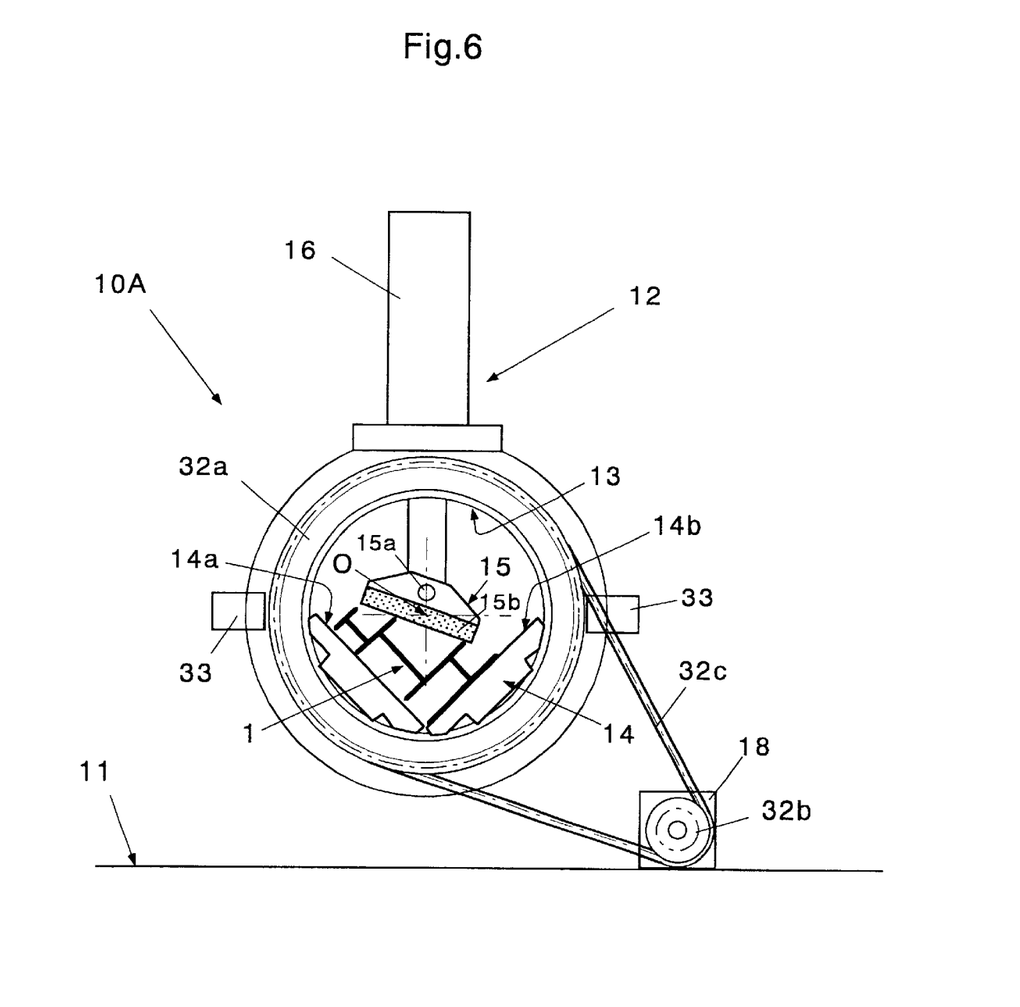
FIG. 6 is a front view similar to FIG. 4, showing a second embodiment of the present invention.

FIG. 6 is a front view similar to FIG. 4, showing a second embodiment of the present invention.

The driving clamp device 10A shown in FIG. 6 includes a belt driving device including a belt pulley 32a fixed to the hollow ring 13, a belt pulley 32b driven by the driving device 18, and a timing belt 32c extended between the belt pulleys 32a and 32b. Therefore, the belt pulley 32a is rotated via the timing belt 32c by the driving device 18, and the thin section long workpiece 1 held by the holding device 12 can freely be rotated centering on the horizontal axis O. Moreover, in the second embodiment, a brake 33 is disposed, and the hollow ring 13 can be fixed in a predetermined position. Other constitutions are similar to those of FIG. 4.

Also according to the constitution, the arbitrary portion to be machined of the thin section long workpiece 1 can be directed in a direction in which the portion is easily machined (e.g., upward direction) by the rotation of the driving clamp device 10A. In addition to the aforementioned example, driving means of the driving clamp device 10A may be gear driving, belt driving, and the like.

Figure 7:
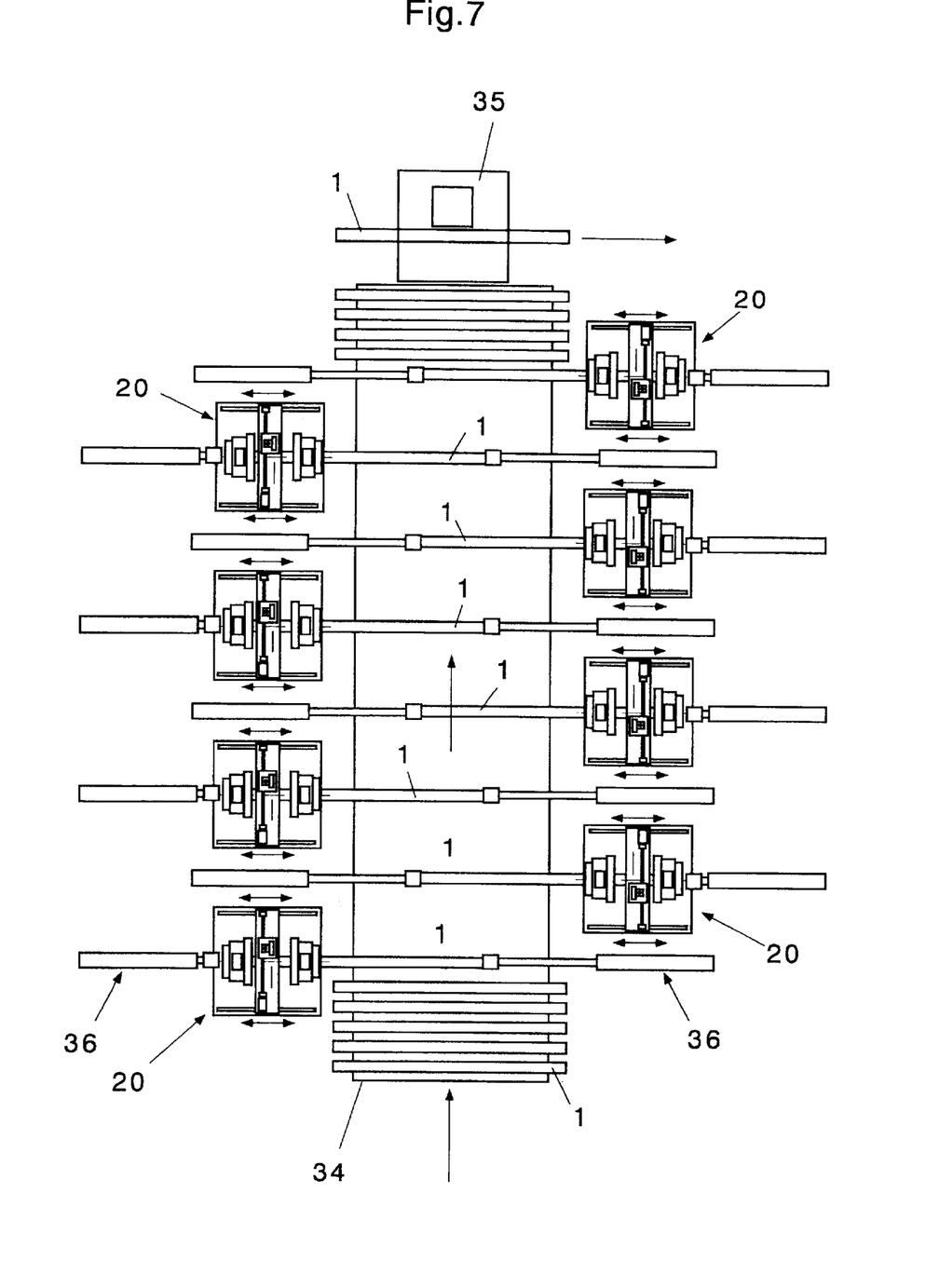
FIG. 7 is a layout diagram showing a third embodiment of the present invention.

FIG. 7 is a layout diagram showing a third embodiment of the present invention. In FIG. 7, a machining equipment of the thin section long workpiece of the present invention includes a plurality (eight in FIG. 7) of workpiece machining apparatuses 20, and additionally includes one conveying apparatus 34 and a plurality (eight in FIG. 7) of carrying apparatuses 36.

The conveying apparatus 34 is, for example, a chain conveyor or a belt conveyor, and horizontally conveys the thin section long workpiece 1 in a width direction of the workpiece. The horizontal conveyance is preferably performed at a constant pitch, but the present invention is not limited to this.

Regarding the plurality (eight in FIG. 7) of workpiece machining apparatuses 20, in the present embodiment, each four apparatuses 20 are disposed on each end side of the thin section long workpiece 1, left and right positions deviate from each other. In addition the apparatuses 20 are disposed at a space in the width direction. The space is same with a conveyance pitch of the conveying apparatus 34.

The carrying apparatus 36 is, for example, a pair of air cylinders having a long stroke, carries in the thin section long workpiece 1 positioned in an insertion position of the machining apparatus 20 into each machining apparatus, and carries out the machined workpiece. Additionally, in FIG. 7, reference numeral 35 denotes an intermediate machining apparatus for machining an intermediate portion of the workpiece 1.

According to the constitution, the conveying apparatus 34 horizontally conveys (as shown by an arrow) the thin section long workpiece 1 in the width direction of the workpiece, and the carrying apparatus 36 carries in the thin section long workpiece 1 into each machining apparatus 20 and carries out the machined workpiece. Therefore, the plurality of workpiece machining apparatuses 20 arranged at the space in the width direction of the workpiece 1 can continuously perform the different machinings (e.g., milling, hole-making, slotting, and the like) on the thin section long workpiece 1 at the same time. Therefore, odd-shaped workpiece such as an aluminum sash can continuously be machined, machining time per workpiece is shortened, and productivity can be enhanced.

Figure 8:
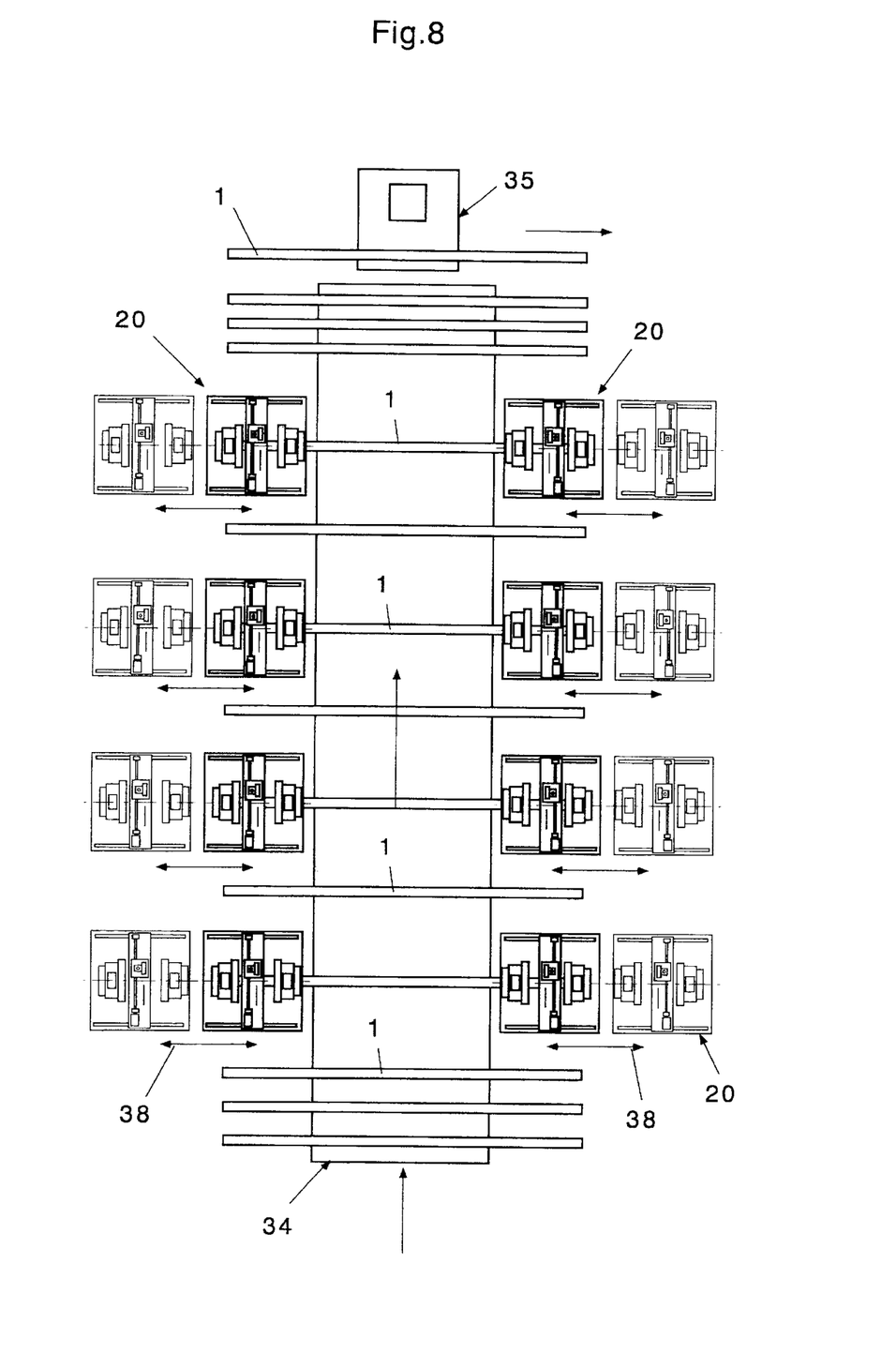
FIG. 8 is a layout diagram showing a fourth embodiment of the present invention.

FIG. 8 is a layout diagram showing a fourth embodiment of the present invention. In FIG. 8, the machining equipment of the thin section long workpiece of the present invention includes the plurality (eight in FIG. 8) of workpiece machining apparatuses 20, and additionally includes one conveying apparatus 34 and a plurality (eight in FIG. 8) of reciprocating apparatuses 38.

Regarding the plurality (eight in FIG. 8) of workpiece machining apparatuses 20, in the present embodiment, each four apparatuses 20 are disposed on each end side of the thin section long workpiece 1. In addition the apparatuses 20 are disposed opposite to each other in the same left and right positions, and the apparatuses are disposed at a space in the width direction. The space is same with the conveyance pitch of the conveying apparatus 34.

The reciprocating apparatus 38 is, for example, a hydraulic cylinder having a long stroke, and reciprocates the machining apparatus 20 in the longitudinal direction of the thin section long workpiece 1. Other constitutions are similar to those of FIG. 7.

According to the constitution, the conveying apparatus 34 horizontally conveys the thin section long workpiece 1 in the width direction of the workpiece, and the reciprocating apparatus 38 reciprocates the machining apparatus 20 in the longitudinal direction of the thin section long workpiece 1. The end of the thin section long workpiece 1 is thus carried into and out from each machining apparatus 20. Therefore, the plurality of workpiece machining apparatuses 20 arranged at the space in the width direction of the workpiece can continuously perform the different machinings on the thin section long workpiece at the same time.

The machining apparatus of the thin section long workpiece according to the present invention has the following characteristics.

(1) The fixing jig (intersecting flat member 14) having a symmetrical V-shaped (90 degrees) bottom portion can process the intermediate portion of the thin section long workpiece 1 fixed by the driving clamp device (10A) and driven clamp device (10B) mounted front and back the machining device. Moreover, only the driving clamp device (10A) can be used to process only the end of the thin section long workpiece 1.

(2) When the workpiece is inserted, an inherent position of the workpiece is determined with respect to the jig by an own weight of the workpiece.

(3) The inherent position of the workpiece is determined, and the workpiece is fixed (clamped) by applying a downward force from above by a power of the air cylinder, so that the workpiece bears the cutting resistance. A portion of the workpiece movable by the air cylinder is free in a rotation direction, and a tip end of the workpiece is formed of a soft and elastic workpiece such as urethane. In this case, even when the workpiece has a protrusion, the workpiece supported by at least two points is fixed in an originally placed state, and the workpiece can inherently be positioned and fixed.

(4) The rotation of the whole jig is controlled by the worm gear and the like so that the portion to be machined of the fixed workpiece extends in parallel to the X axis of the machining apparatus. A rotation range is 360 degrees, and the workpiece once clamped can be machined from an arbitrary direction.

Moreover, in the machining equipment of the present invention, the plurality of workpiece machining apparatuses 20 can continuously perform the different machinings on the thin section long workpiece 1 at the same time. The odd-shaped workpiece can continuously be machined, the machining time per odd-shaped workpiece is shortened, and the productivity can be enhanced.

Therefore, the machining apparatus and equipment of the thin section long workpiece according to the present invention have superior effects that the arbitrary shape machining can efficiently be performed in the side portion of the thin section long workpiece having the constant section shape or having the same section shape in the spaced positions in the longitudinal direction in a short time without using any exclusive-use jig or tool.

Additionally, the present invention has been described by some preferable embodiments, and it will be bystood that the scope of right included in the present invention is not limited by the embodiments. On the contrary, the scope of right of the present invention includes all of improvements, modifications, and equivalents included in the scope of the appended claims.

What is claimed is:

1. A machining apparatus of a thin section long workpiece, comprising a workpiece clamp device for horizontally holding the thin section long workpiece having a constant section shape or having the same section shape in spaced positions in a longitudinal direction in two positions of the same section shape, wherein the workpiece clamp device is constituted of a driving clamp device and a driven clamp device having the same holding device, the driving clamp device rotates the thin section long workpiece centering on a horizontal axis O extending in the longitudinal direction of the thin section long workpiece, and the driven clamp device follows movement of the thin section long workpiece and idles centering on said horizontal axis, wherein the holding device comprises: a hollow ring supported so as to be rotatable centering on the horizontal axis O and which inner portion has a cylindrical shape; an intersecting flat member attached to an inner portion of the hollow ring and which has two flat portions extending in parallel with the horizontal axis and crossing at an angle relative to each other; and a holding head disposed in the hollow ring in a position opposite to the intersecting flat member, directly moved in a diametrical direction toward the intersecting flat member, and freely tilted centering on an axis parallel to the horizontal axis O.

2. The machining apparatus of the thin section long workpiece according to claim 1, further comprising: a machining head which has a machining tool and a machining liquid supply device and which is driven centering on a vertical axis Z; and a NC driving device for driving the machining head in a Z-axis direction, and an X-axis direction and a Y-axis direction crossing at right angles to the Z-axis direction with respect to the thin section long workpiece by numerical control.

3. The machining apparatus of the thin section long workpiece according to claim 2 wherein said NC driving device comprises: a Z-axis driving device for driving the machining head in the Z-axis direction by the numerical control; an X-axis driving device for driving the Z-axis driving device in the horizontal X-axis direction crossing at right angles to said horizontal axis O by the numerical control; and a Y-axis driving device for driving the X-axis driving device in the Y-axis direction parallel to said horizontal axis O by the numerical control.

4. The machining apparatus of the thin section long workpiece according to claim 2 wherein said machining head is an ultrasonic device which generates a straight vibration of the Z-axis direction, or a torsional vibration around a Z axis.

5. The machining apparatus of the thin section long workpiece according to claim 2 wherein said machining tool is a cutting tool having an intermittently cutting blade, a grinding tool having a continuously cutting blade, or a polishing tool having much elasticity.

6. The machining apparatus of the thin section long workpiece according to claim 5, wherein said cutting tool has an end mill shape for machining a side portion in an upper portion of the Z-axis direction, and also has a drill shape for making a hole or machining an end portion in a lower portion of the Z-axis direction.

7. The machining apparatus of the thin section long workpiece according to claim 5 wherein said grinding tool is formed of a conductive grindstone, and comprises an electrolytic dressing device.

8. The machining apparatus of the thin section long workpiece according to claim 1 wherein said driving clamp device comprises a worm driving device having a worm and worm wheel, or a belt driving device having a belt, a pulley, and a brake.

9. The machining apparatus of the thin section long workpiece according to claim 1, further comprising: a machining head which has a machining tool and a machining liquid supply device and which is driven centering on a vertical axis Z; and a NC driving device for driving the machining head in a Z-axis direction, and an X-axis direction and a Y-axis direction crossing at right angles to the Z-axis direction with respect to the thin section long workpiece by numerical control.

10. The machining apparatus of the thin section long workpiece according to claim 9, wherein said NC driving device comprises: a Z-axis driving device for driving the machining head in the Z-axis direction by the numerical control; and X-axis driving device for driving the Z-axis driving device in the horizontal X-axis direction crossing at right angles to said horizontal axis O by the numerical control; and a Y-axis driving device for driving the X-axis driving device in the Y-axis direction parallel to said horizontal axis O by the numerical control.

11. The machining apparatus of the thin section long workpiece according to claim 9 wherein said machining head is an ultrasonic device which generates a straight vibration of the Z-axis direction, or a torsional vibration around a Z axis.

12. The machining apparatus of the thin section long workpiece according to claim 9 wherein said machining tool is a cutting tool having an intermittently cutting blade, a grinding tool having a continuously cutting blade, or a polishing tool having much elasticity.

13. The machining apparatus of the thin section long workpiece according to claim 12 wherein said cutting tool has an end mill shape for machining a side portion in an upper portion of the Z-axis direction, and also has a drill shape for making a hole or machining an end portion in a lower portion of the Z-axis direction.

14. The machining apparatus of the thin section long workpiece according to claim 12, wherein said grinding tool is formed of a conductive grindstone, and comprises an electrolytic dressing device.

* * * * *